US012613637B1

(12) United States Patent
Baryudin et al.

(10) Patent No.: US 12,613,637 B1
(45) Date of Patent: Apr. 28, 2026

(54) TORN-WRITE SELF-DETECTION IN A STORAGE VOLUME

(71) Applicant: Amazon Technologies, Inc., Seattle, WA (US)

(72) Inventors: Leonid Baryudin, San Jose, CA (US); Oleg Kiselev, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 17/957,928

(22) Filed: Sep. 30, 2022

(51) Int. Cl.
  *G06F 3/06* (2006.01)
  *G06F 11/08* (2006.01)

(52) U.S. Cl.
  CPC .......... *G06F 3/0619* (2013.01); *G06F 3/0653* (2013.01); *G06F 3/0673* (2013.01); *G06F 11/08* (2013.01)

(58) Field of Classification Search
  CPC .... G06F 3/0619; G06F 3/0653; G06F 3/0673; G06F 11/08
  See application file for complete search history.

(56) References Cited

U.S. PATENT DOCUMENTS

| | | | | |
|---|---|---|---|---|
| 2014/0359399 A1* | 12/2014 | Francis | ................. | G06F 3/0619 |
| | | | | 714/773 |
| 2015/0261610 A1* | 9/2015 | Gupta | ................... | G06F 3/0608 |
| | | | | 714/807 |
| 2017/0337967 A1* | 11/2017 | Berman | .............. | G11C 11/5628 |
| 2023/0064603 A1* | 3/2023 | Blasco | ................ | G06F 12/0811 |
| 2023/0409217 A1* | 12/2023 | Ghaly | ................... | G06F 3/0679 |

* cited by examiner

*Primary Examiner* — Mark D Featherstone
*Assistant Examiner* — Rong Tang
(74) *Attorney, Agent, or Firm* — Klarquist Sparkman, LLP

(57) ABSTRACT

A torn-write self-detection feature is implemented by a storage volume, which can be a single storage device or a plurality of storage devices. In one embodiment, page protection metadata is added to each data page. The metadata can include a data page size and a unique serial number for each group of sectors this data page is spanning. The page size and unique serial number can be stored in association with the data for each sector group. The unique serial number can follow a pattern, such as an incremental pattern. Upon a read of the data page, the page size and the unique serial number are checked for each sector group. If the serial numbers are consistent with the pattern, and the page size is correct, then the data is passed to the requesting host. Otherwise, a torn-write error condition is indicated to the host.

18 Claims, 10 Drawing Sheets

Figure 1:
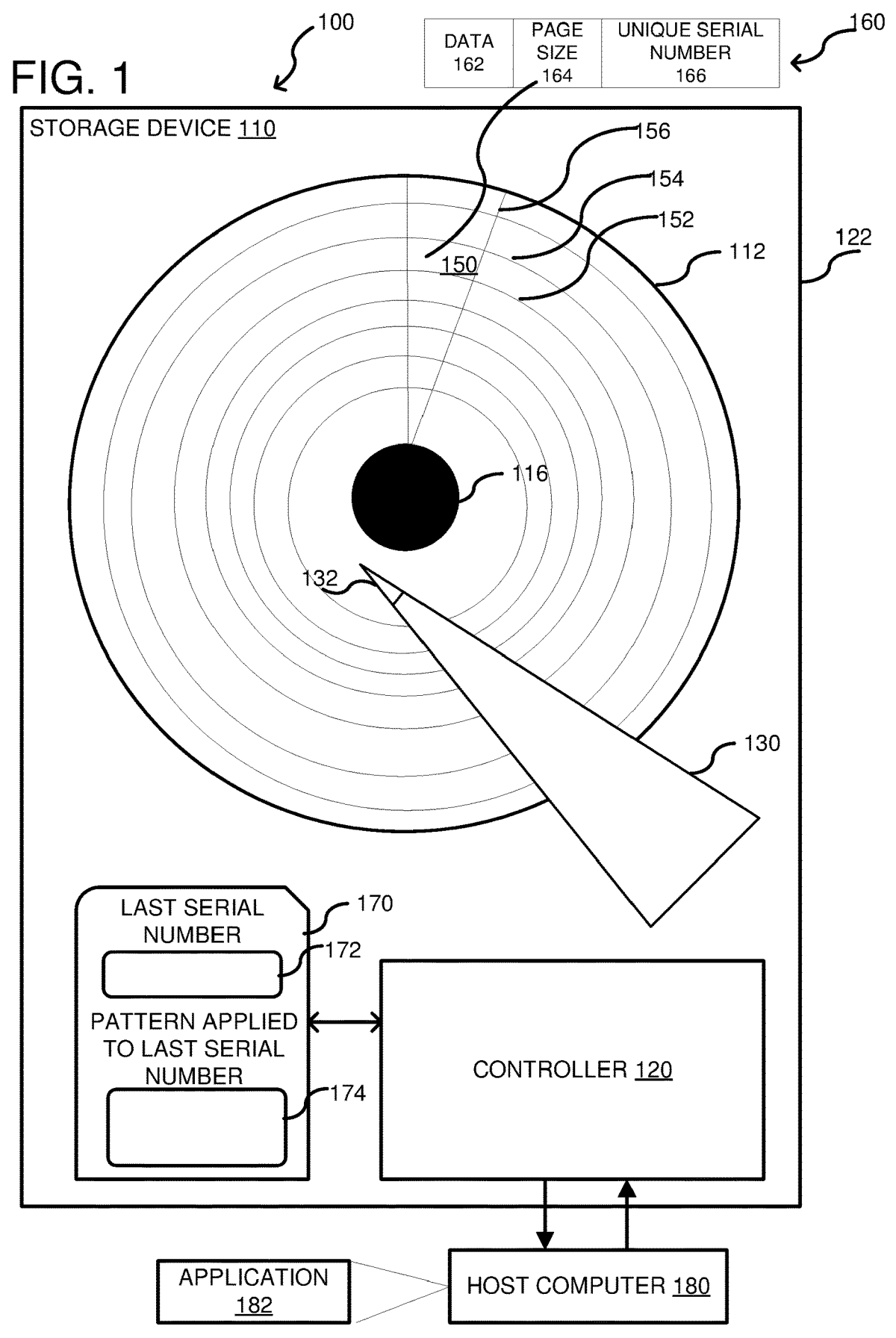

| DATA 162 | PAGE SIZE 164 | UNIQUE SERIAL NUMBER 166 |
|---|---|---|

STORAGE DEVICE 110

156
154
152
150
112
122
116
132
130

LAST SERIAL NUMBER
170
172

PATTERN APPLIED TO LAST SERIAL NUMBER
174

CONTROLLER 120

APPLICATION 182

HOST COMPUTER 180

VALID PAGES BASED ON METADATA

METADATA ASSOCIATED WITH PAGE

METADATA ASSOCIATED WITH ANOTHER PAGE

FIG. 4

TORN PAGES BASED ON METADATA

PAGE

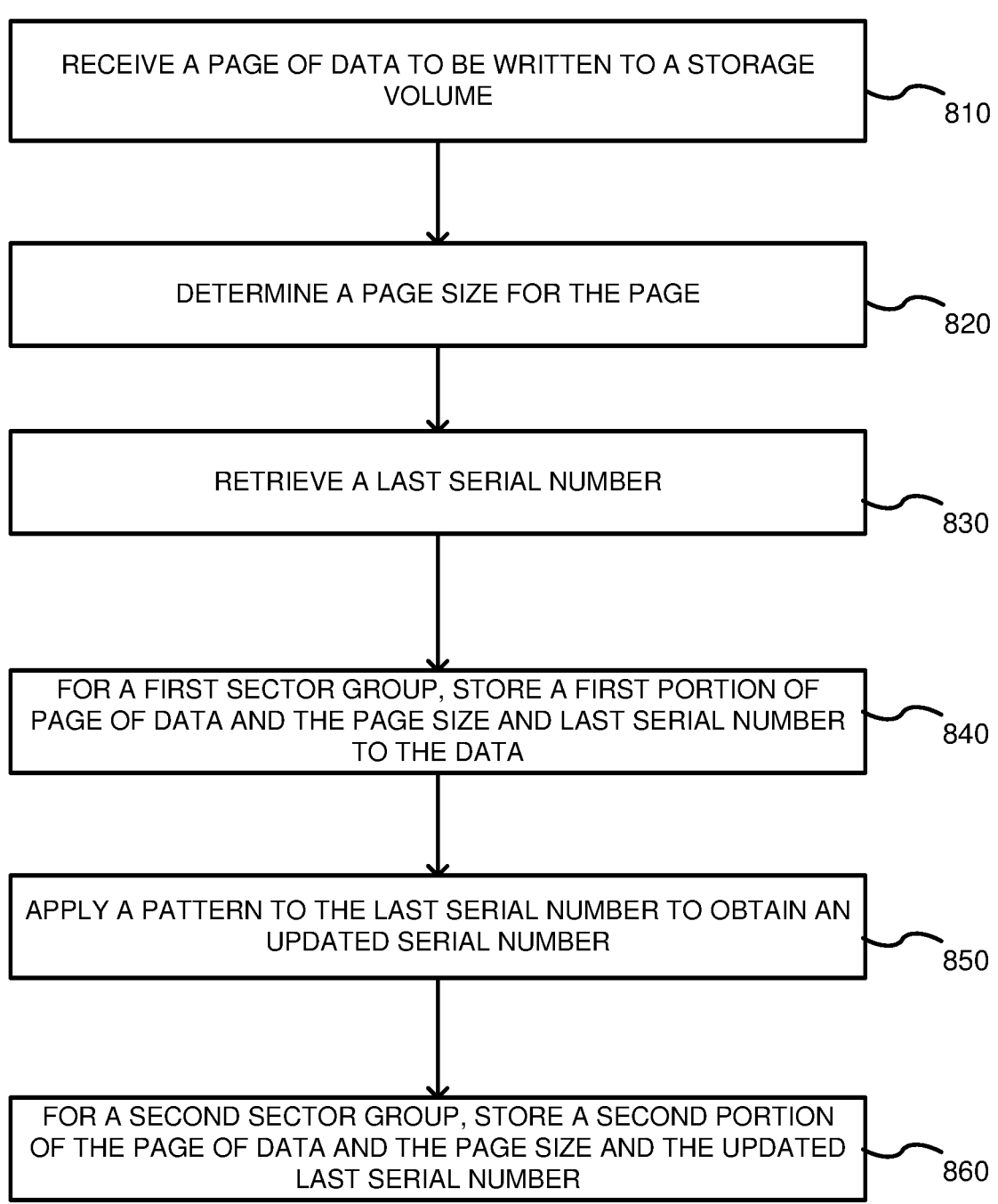

RECEIVE A PAGE OF DATA TO BE WRITTEN TO A STORAGE VOLUME — 810

DETERMINE A PAGE SIZE FOR THE PAGE — 820

RETRIEVE A LAST SERIAL NUMBER — 830

FOR A FIRST SECTOR GROUP, STORE A FIRST PORTION OF PAGE OF DATA AND THE PAGE SIZE AND LAST SERIAL NUMBER TO THE DATA — 840

APPLY A PATTERN TO THE LAST SERIAL NUMBER TO OBTAIN AN UPDATED SERIAL NUMBER — 850

FOR A SECOND SECTOR GROUP, STORE A SECOND PORTION OF THE PAGE OF DATA AND THE PAGE SIZE AND THE UPDATED LAST SERIAL NUMBER — 860

COMPUTING ENVIRONMENT 1000

1030 central processing unit 1010 graphics or co-processing unit 1015

MEMORY 1020

MEMORY 1025

COMMUNICATION CONNECTION(S) 1070

INPUT DEVICE(S) 1050

OUTPUT DEVICE(S) 1060

STORAGE 1040

SOFTWARE 1080 IMPLEMENTING DESCRIBED TECHNOLOGIES

TORN-WRITE SELF-DETECTION IN A STORAGE VOLUME

BACKGROUND

In a computer storage, a sector is a subdivision of a track on a magnetic disk. Each sector stores a fixed amount of user-accessible data, traditionally 512 bytes for hard disk drives (HDDs). Although Solid-State Drives (SSD) do not have a physical disk like a hard disk drive, data is also stored into smaller units, also traditionally called sectors. Regardless of the type of storage device, generally, writes to a single sector of a storage device are "atomic", meaning that the storage device will guarantee that that sector will contain only the old data or only the newly written data, rather than a mix of the old and new data. However, most applications, filesystems and databases write data in larger units, often called "pages", which consist of multiple sectors. This is done to significantly improve performance. When data is written to multiple sectors and a disruption occurs, such as a power outage, device crash, or network failure, the data contained in a page may end up partially written, with some sectors containing the new data and other sectors containing the old data, because new data was not yet written to those sectors. This type of data corruption is often called a "torn write" or "torn page" error. Most modern storage devices offer atomicity at the level of 4 KiB "blocks", but the same kind of corruption may occur on those devices when writing across "block" boundaries. To correct torn writes, databases, file systems, and other data storage applications can first append new data pages to a log (e.g., a "double-write buffer" in MySQL, the file system journal when using "data=journal" mount option of ext4 file system, and so on) and, when that log write completes, write the same new data pages to their proper destination in a storage device, where it may overwrite previously written old data. Thus, after the disruption, when a database, a file system, or another type of data storage application performs its recovery, the log gets replayed, overwriting the recently written, potentially corrupted pages, and thereby repairing that data. Unfortunately, while it is very effective, using this form of data logging adversely impacts database, filesystem or data storage application's performance.

Some users choose to disable data logging, like setting the doublewrite buffer mode in MySQL to "OFF", etc., which can result in significant performance improvement, such as by as much as 30%. The overwhelming number of ext4 filesystem deployments, don't use data logging at all and log only the metadata, in order to gain additional performance. However, to disable data logging, a user must be confident that torn writes will not happen. But with data logging disabled, page corruption might remain "silent", destroying user's data without their knowledge. Errors may be detected on a read, such as by performing page corruption detection (e.g., a page checksum), but such detection methods are often disabled because of their low reliability and negative performance impact. Another complication with using a "naïve" corruption detection is that it cannot differentiate a torn write error from other forms of data corruption, caused by other factors (software errors, storage media errors, subtle hardware errors). One alternative to torn-write prevention is torn-write detection. The existing torn-write detection mechanisms, like the DETECT_ONLY double-write buffer mode introduced in MySQL 8.0.30, log only metadata to the doublewrite buffers, rather than the data itself. The metadata is used for early detection of torn-write errors during database crash recovery. This DETEC- T_ONLY approach results in a less significant negative performance impact, but it still results in much worse performance compared to not using any data logging. Improved techniques are needed to detect torn writes in storage devices.

BRIEF DESCRIPTION OF THE DRAWINGS

FIG. 1 is an example storage volume according to one embodiment, which is a hard-disk drive, with an internal controller for performing torn-write self detection.

FIG. 4 includes examples of a page of data wherein a torn write is detected.

FIG. 7 is an example system diagram showing a plurality of storage volumes in the multi-tenant environment, with a controller executing within a server computer to control the storage volumes.

FIG. 8 is a flowchart according to an embodiment for writing data to a storage volume for torn write detection.

DETAILED DESCRIPTION

Figure 2:
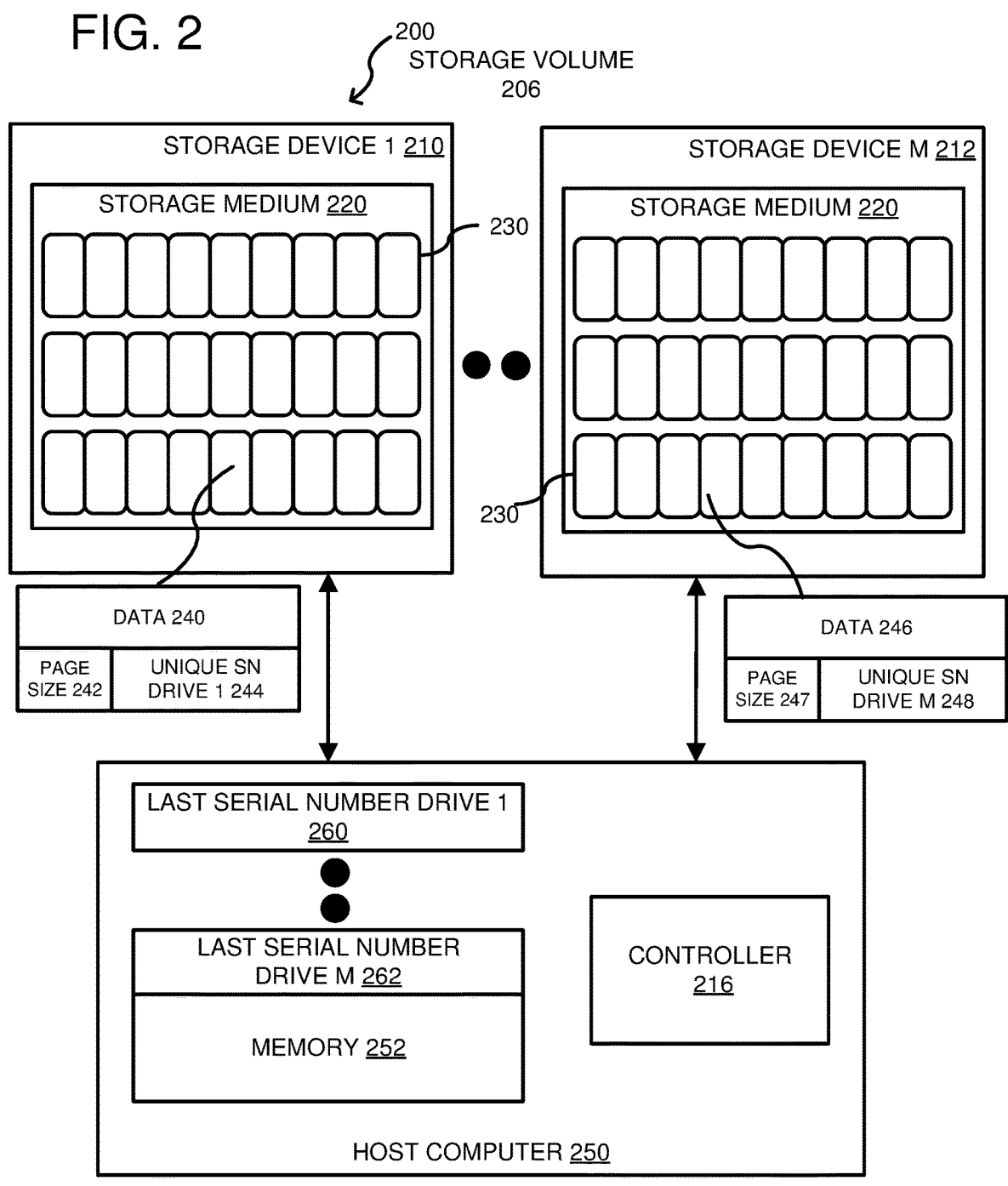
FIG. 2 is another example storage volume according to another embodiment, which includes multiple SSDs, with an external controller for performing torn-write self detection over the multiple SSDs.

Existing torn-write prevention and detection solutions result in a significant negative performance impact. Knowing that a page of data is corrupted by a torn write prevents silent accumulation of corruption of the data can allow for successful recovery, and narrows the effort of diagnosing and fixing the hardware or software defect that caused the torn write. However, current storage devices do not provide for low-overhead self-detection of torn writes.

In one embodiment, a torn-write self-detection feature is implemented by a storage volume, which can include a single storage device or a plurality of storage devices. The self-detection feature allows a user to disable existing double-write features on storage devices to improve overall performance. Page protection metadata is added to each page by the storage device itself, transparently for a user. The metadata can include an encoded page size and a unique page serial number (which can be called a page identifier or page ID, or just ID). For a page written across multiple sectors, the page size and page ID can be stored with the data for each sector or group of sectors, and the ID will be unique for that write to that sector or group of sectors. The ID value is not random, but follows a pattern, such as an incremental pattern. Upon a read of the page, the page size and the ID are checked for each sector. If the IDs are consistent with the pattern, and the page size is correct, it means that the page was written fully and the data is passed to the requesting host without error. However, if the page ID is not consistent with what is expected, then a torn-write error condition is indicated to the host. To be "consistent" with the pattern means that intervening numbers of the pattern can be used by other pages. For example, using an increasing pattern or incrementing pattern page, containing 4 sectors can be written with serial numbers 2, 3, 4 and 5. Upon a read of that page, the serial numbers can be 2, 3, 10 and 7. As long as each subsequent number is larger or equal than the one which was initially saved with this sectors group according to the pattern, it is said to be consistent with an incrementing pattern despite the numbers not being strictly sequential. In the 2, 3, 10, 7 example, the first two serial numbers (2 and 3) are equal to those which are expected, while the two others (10 and 7) are larger than the expected 4 and 5. To be inconsistent with the pattern means at least one number deviates from the pattern, such as 2, 3, 1 and 7, where 1 is less than the expected value 4. Thus, a comparison of two numbers is consistent if a comparison between the two shows a clear ordering in the serial numbers. A monotonic sequence of integers is an example of serial numbers that can be used. Timestamps is another example of serial numbers that can be used. Other pattern schemes are also possible. By using the stored page size and page ID in each sector or group of sectors, the storage volume can perform a self-detection of torn writes. Using the techniques disclosed herein results in a significant performance improvement for database writes compared to DETECT_ONLY doublewrite buffer mode of MySQL.

In any of the examples described herein, a storage volume can include one or more storage devices that can be any device capable of storing data in one or more physical storage media. For example, the storage volume can include one or more of a magnetic storage device, such as a hard disk drive. Other examples of a storage volume include one or more solid state storage devices (such as NAND-type flash devices and NOR-type flash devices), and random-access data storage devices (such as DRAM devices, and other persistent memory (e.g., storage class memory (SCM)). Other combinations of disparate storage media are also possible to form a storage volume.

The storage volume can organize storage locations into multiple data sectors (or simply "sectors"). The sectors can have different storage characteristics and different storage formats. Example formats include a perpendicular magnetic recording (PMR) format and a shingled magnetic recording (SMR) format. Additional formats include NAND flash storage which can include one of the following: single-level cell (SLC) storage, multi-level cell (MLC) storage, triple-level cell (TLC) storage and quad-level cell (QLC) storage. Any desired storage formats can be used. The sector sizes can also vary. Example sector sizes include 4 KiB and 512 B, but any sector size can be used. Embodiments herein detect torn writes for IOs of a certain size, called Data Pages or simply Pages. A data page includes one or more sectors and the first sector's Logical Block Address (LBA) is page-size aligned. Example data page size includes 8, 12, 16, 20, 24, 32, 64 KiB, etc. However, any size data page can be used so long as it includes an integer number of sectors and is aligned to a boundary of the same size. Thus, to be a data page as described herein, the data should be properly sized (e.g., an integer multiple of a sector size) and properly aligned to a boundary, such as is done in databases and file systems. Data that is unaligned is marked as such and torn write error detection is not used.

In any of the examples described herein, a host computer can be a server or other computing device that comprises a processor and a memory, and that is connected to the storage volume. The host computer is connected to the storage volume and configured to send data read and write operations to the storage volume and receive responses from the storage volume. The connection can be a direct connection or an indirect connection, such as a connection over a network. In scenarios where the host computer is connected to more than one storage volume, the various connections can be of the same type or different types.

A storage controller is a device that receives a request for writing or reading from the storage volume and controls the write and read operations. The controller generally includes a processor and can include memory and networking capabilities. The controller can be housed within a same physical chassis as the storage device (e.g., within a disk drive outer housing) or can be coupled to two or more storage devices remotely through a network.

FIG. 1 is a diagram of example system 100 configured to self-detect torn writes in a storage volume, which in this case includes a single storage device 110, shown as a hard drive. The storage device 110 includes a magnetic disk 112 that is configured to rotate on a spindle 116. A controller 120 is within a chassis 122 of the storage device 110 and is configured to rotate the magnetic disk 112 to perform data read and/or write operations via a moveable actuator arm 130. The actuator arm 130 can comprise a read/write head 132 and the actuator arm 130 can be moved to position the read/write head 132 over different sectors of the magnetic disk 112, such as a sector 150, which is between concentric tracks 152 and 154 in a geometric segment 156. As shown at 160, when a write is performed, the data 162 can be written with metadata appended including a page size 164 and a unique serial number 166. The page size 164 can be based on a size of the data and is defined by how many sectors are required to store the page. In many embodiments unique serial numbers can be generated and attached as metadata to each data, such as a 4 KiB data chunk, which could be single sector if sectors size is 4 KiB or a group of sectors (e.g., 8 sectors if sector size is 512 B). Although a 4 KiB data chunk is used as an example herein, the block size can be 512 bytes or any other desired block size. Thus, in this example, the supported page size is 4 KiB*N (N=1, 2, . . . ). Each sector group can be written atomically, 4 KiB in full or nothing at all, which is often the case for storage devices. In one example, the following table can be used to encode page size in the metadata (here only pages smaller or equal to 32 KiB are considered, but bigger page sizes can be encoded in a similar way):

| Page Size Bits | Page Size |
|---|---|
| 000 | Not part of a page (written as a single 4 KiB chunk) |
| 001 | 8 KiB Data Page |
| 010 | 12 KiB Data Page |
| 011 | 16 KiB Data Page |
| 100 | 20 KiB Data Page |
| 101 | 24 KiB Data Page |
| 110 | 28 KiB Data Page |
| 111 | 32 KiB Data Page |

Additional page sizes can be used, such as a 64 KiB data page and a 128 KiB data page. The unique serial number 166 is generated by the controller for each 4 KiB data chunk using a last serial number saved in a memory 170 at memory element 172. Each time the controller 120 writes a sector group (4 KiB) of the disk 112, the controller changes the last serial number 172 in accordance with a pattern 174 (e.g., increment, decrement, etc.). Thus, each 4 KiB chunk (which can be a sector or group of sectors) has a unique serial number or ID. Enough bits can be allocated for a serial number to guarantee it does not wrap around during storage device lifetime. For example, if a drive's capacity is C and a number of times the device could be overwritten during its lifetime is P, then the number of bits can be B=log 2(P*C/ Block Size) (Block Size being 4 KiB in this embodiment). The controller continuously updates the last serial number for each sector group written so that every sector group of data stored on the drive uses a unique serial number and the last serial number 172 is stored for future writes. The controller also can save this last serial number persistently in the case of power loss to be used after power is restored. The persistent number can be retrieved upon system boot. In one example, a first sector group of a page can be written using a first serial number and a second sector group of a page can be written with the first serial number incremented by 1. Upon a read, the controller 120 can check if the serial numbers 166 in the sector groups' metadata 150 are consistent with each other and with respect to the pattern 174 applied to the serial numbers 166. If they are consistent, then the page can be returned without error. However, if they are not consistent (further examples are shown below in FIG. 4), then the controller can determine that there is a torn write and report an error. The pattern 174 can be a fixed pattern, such as an incrementing pattern, or it can be configurable.

In a typical scenario, a host computer 180 is coupled to the storage device 110 and an application 182 executes on the host computer. The application 182 can write data to the storage device 110 and then read the data back at a later time. Upon writing the data, the controller 120 uses the last serial number 172 to generate the metadata 160. Additionally, the controller determines the page size 164. The page size 164 and unique serial number 166 are appended to the data 162 and stored with first sector group (4 KiB typically but any block size can be used). For each additional sector group of the data page, the controller applies the pattern 174 to generate a next unique serial number 166. The page size is a same value for each sector group of the page. When the write is complete, the controller acknowledges the write to the host computer 180. At a later time, the application 182 can request a read operation of that data page. The controller 120 can then read each sector group and check the metadata 164 and 166 in each sector for conformance. Nonconforming metadata can include the unique serial number 166 not following the pattern 174. If the metadata is not conformant, and that sector's metadata includes page size 164 that matches the page size 164 values of the rest of its sector group, then a corrupted data error status could be sent to the application 182 (see examples below). Otherwise, a successful data read status is returned to the application.

FIG. 2 is another example of system 200 for detecting torn writes. A storage volume 206 includes storage device 1 210 through storage device M 212 (where M is any integer number) and a controller 216 is external to the storage devices 210, 212. In this embodiment, the storage devices 210, 212 are shown as SSDs, but multiple of the hard disk drives of FIG. 1 could be used instead. Likewise, any of the SSDs of FIG. 2 could be used in place of the hard disk drive of FIG. 1. Each storage device 210, 212 includes a storage medium 220 comprising memory divided into sectors 230. For storage device 1 210, data written to the media for each group of sectors can comprise a data portion 240, a page size 242, and a unique serial number for drive 1 244. Storage device M 212 also includes a plurality of sectors wherein data is written in a data portion 246, a page size portion 247, and a unique serial number 248. Each sector group's unique serial number differs from that of the other sector groups and can be unique across storage devices 1-M, but each serial number can be assigned by the same controller 216. The controller 216 can be positioned on a host server computer 250 that includes a memory 252. The controller 216 can store a plurality of last serial numbers 260 through 262, wherein each last serial number corresponds to one of the storage devices 210, 212 in the storage volume 206. Thus, the controller 216 stores a same number of last serial numbers 260, 262 as there are storage devices. In an alternative embodiment, the controller can use just a single last serial number for all of the storage devices. In either case, the last serial number can be used by the controller 216 to generate the unique serial numbers 244 through 248 for all of the storage devices. In this embodiment, there is not a pattern configuration, as in FIG. 1, because the pattern can be hard coded, such as an incrementing pattern. Either the hard coded or configurable pattern can be applied in any of the embodiments described herein.

Figure 3:
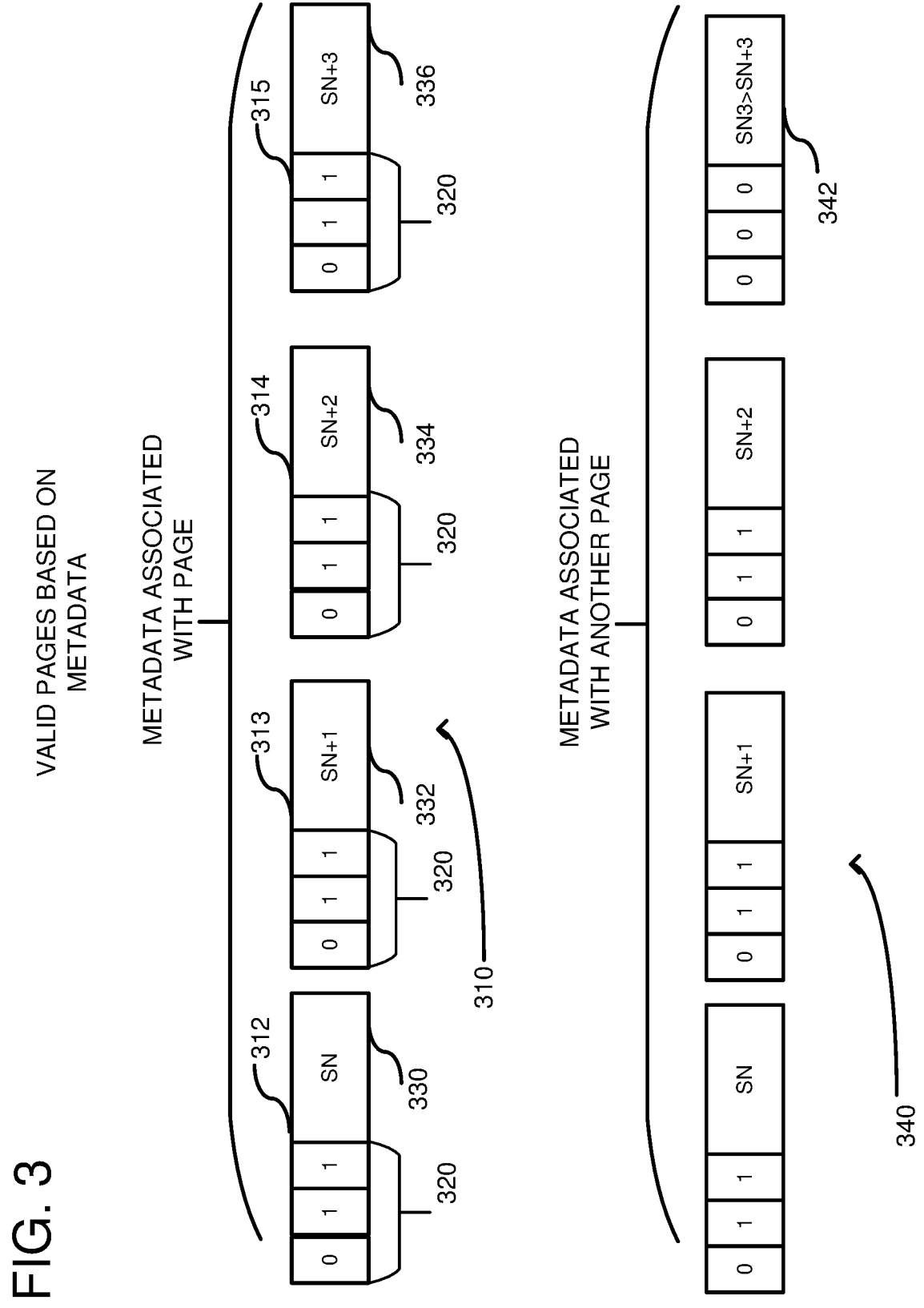
FIG. 3 includes examples of a page of data wherein a torn write is not detected.

FIG. 3 illustrates metadata, including a page size and unique serial number for 4 sector groups that together form a page of data (if a sector group is 4 KiB, the page size is 16 KiB). At 310, metadata associated with a page of data is stored in 4 sector groups 312-315. The metadata includes a 3-bit page size shown at 320, which is the same across each sector for a page (011 in this example is representative of a 16 KiB page). The metadata 310 further includes a serial number 330, 332, 334 and 336 for each sector group. As shown, it is expected that the serial numbers are incremented by 1 for each sector group of data. For example, serial number 332 is one more than the previous serial number 330. Likewise, serial number 334 is one more than serial number 332. The first serial number 330 is initially selected during a page write based upon the last serial number associated with the controller, such as is shown by the last serial number 172 (FIG. 1). Each time the serial number is incremented, the last serial number is also incremented so that each serial number is unique. In this case, because the serial numbers across the sectors of the page follow a desired pattern and the page size is the same, the controller would not detect a torn page. However, the serial numbers are not always one more than a previous sector group's serial number, as shown with the metadata 340 for a different page than the metadata 310. In this case, the last serial number 342 is the previous serial number plus some increment greater than 1. Thus, some other sectors in different pages were written after the page in question, which increased the last serial number resulting in serial number 342 being higher. As long as the serial number 342 is greater than the serial number expected for this sector group in the same page, the pattern is still considered to be followed (i.e., consistent) and a torn write error is not generated.

Figure 4:
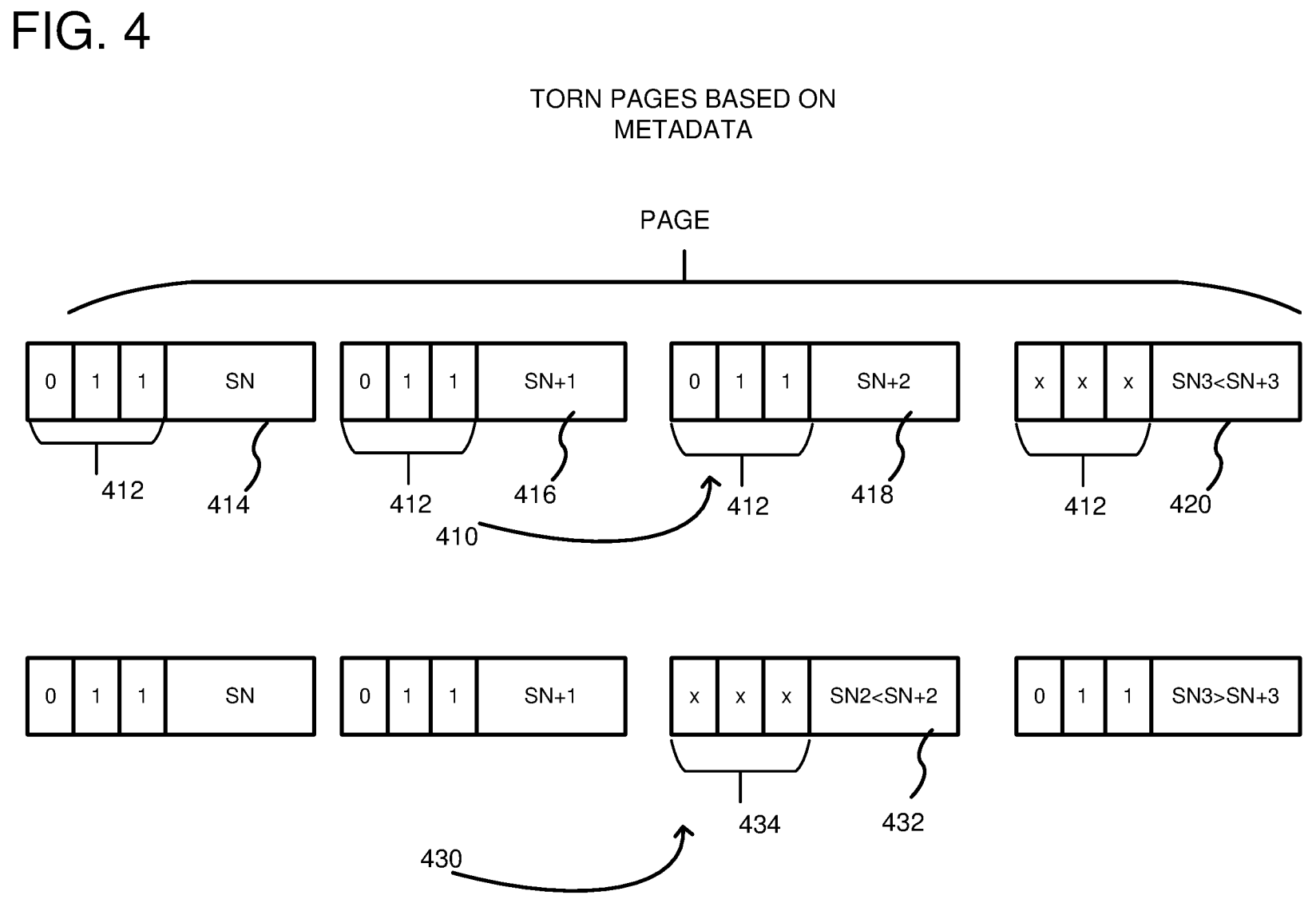

FIG. 4, by contrast, shows examples where a controller can detect a torn page. In each case, the serial number are smaller than expected if they would follow the designated pattern and, thus, indicates that the page was not fully written. That means old sectors are included in the page because some sectors of the data page were not written, resulting in the page being torn (page size shown as xxx means it is not important for the analysis). For example, a page includes metadata 410 in 4 different sector groups with each sector group having the same page size 412. The serial numbers 414, 416, 418 follow a pattern that is consistent with incrementing the last serial number. However, the serial number 420 is not consistent because a later written sector group number cannot have a serial number that is less than a first sector group's plus three, that being fourth sector group of the page. In this case, the serial number 420 is less than first serial number 414 plus three, which does not follow the increasing pattern. Unlike the second example in FIG. 3, it cannot be explained away as data being overwritten at a later time, as the serial number 420 is older than the expected one for the fourth sector group. As a result, the last sector group of the page is "torn out" and not written properly. Accordingly, the controller can determine that a torn write occurred and report an error. To determine that the value 420 is incorrect, the controller can subtract the unique serial number 414 from the serial number 420 and if the result is less than three, then the pattern is not followed and a torn write exists. Likewise, for metadata 430, third sector group has a serial number 432 that is less than value of the first sector group plus two, which does not follow an incremented value of the serial numbers and suggests that old data was not overwritten by a correct new data page for the third sector group. Accordingly, a torn write is indicated. The page size is used to determine, by alignment, which sector group is first. In one example, a 16 KiB write or read is used if it is on a 16 KiB boundary. It should be noted that if the page size of the sector group is different from the rest of its aligned group, but the ID part of metadata is conformant (i.e., follows the pattern), then there can be an indication that the application may have deliberately sent a write of a different size. The nonconformant sector would then be considered for alignment, and the rest of its potential sector group would be examined to validate correctness. If those checks pass, then a conclusion can be reached that a torn write does not exist. For example, a file system that expects 4 KiB atomicity and internally uses 4 KiB pages, may have written data using 64 KiB "chunks", for efficiency. The storage device could interpret those writes as integral pages rather than a combining of discrete smaller writes. Later the file system may overwrite one 4 KiB block of that data. In this case, this "erroneous" 4 KiB block can have a conformant ID but can also have a "non-conformant" page size (000 in this case). The system can recognize this as a valid scenario and not return a torn write error.

Figure 5:
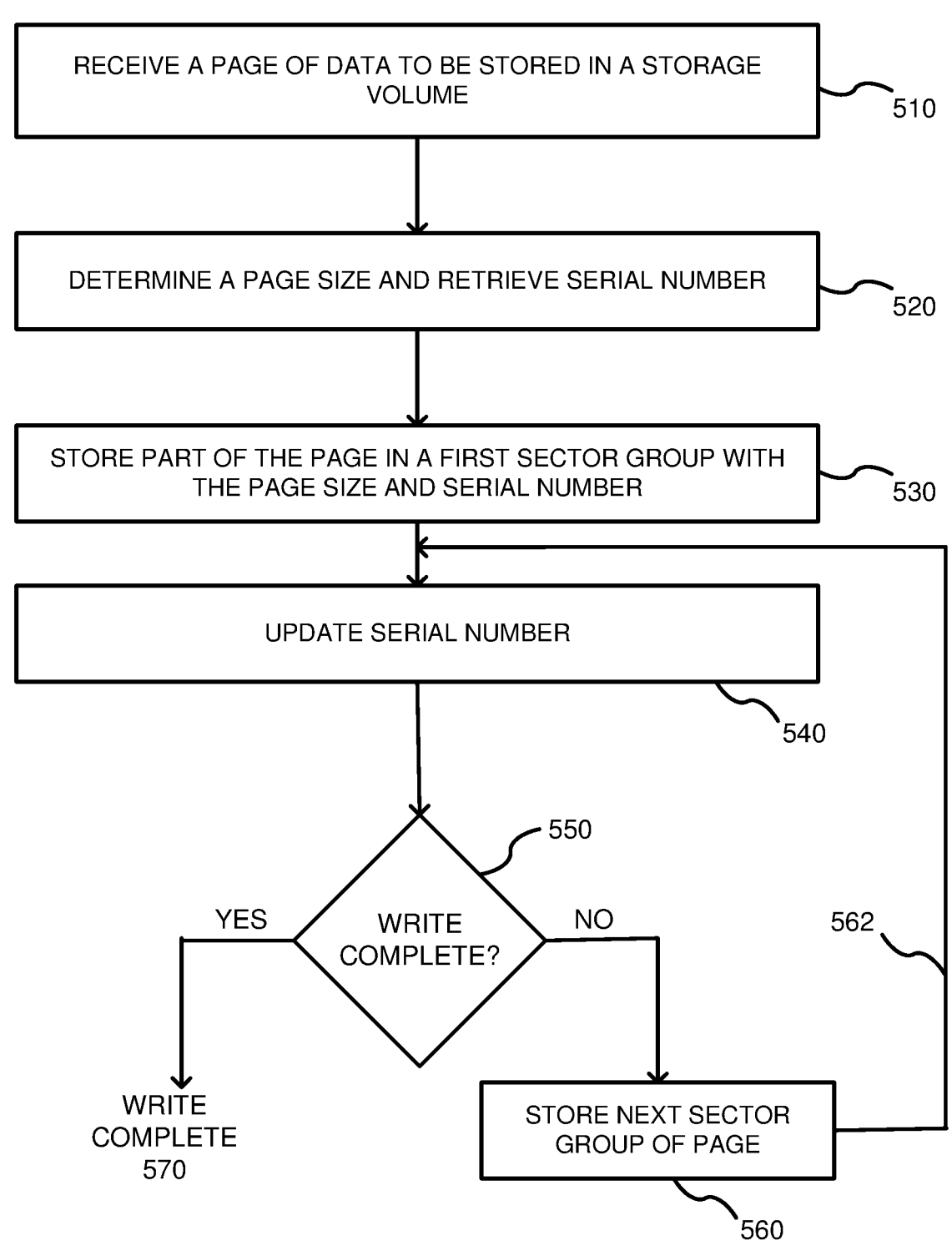
FIG. 5 is a flowchart according to one embodiment wherein metadata is added to each sector of a page write for torn write detection.

FIG. 5 is a flowchart according to one embodiment for writing a page of data across multiple sectors. In process block 510, a page of data can be received to be stored in a storage volume. For example, in FIG. 1, an application 182 can request that a page of data be written to the storage device 110 and such a request can be received by the controller 120. In process block 520, a page size of the page of data is determined from an IO size and first LBA alignment. For example, if the write IO size is (Block size)*N and first LBA alignment is also (Block size)*N, then application 182 is attempting to write a data page of (Block size)*N size. Otherwise, it is not a data page writing, and the page size is set to 000 (e.g., 16 KiB of data written on 16 KiB aligned boundary constitutes a 16 KiB data page while a same 16 KiB written on the boundary which is not 16 KiB aligned is not considered as a data page at all but merely four individual 4 KiB chunks of data with page size encoded as 000 for each of them) and a last serial number is retrieved to become a serial number of a first sector group (normally 4 KiB) of the page. Additionally, the controller 120 can retrieve the last serial number, which can be used for calculating serial numbers of each group of the page's sectors. For example, in FIG. 1, the controller 120 can retrieve the last serial number 172. Additionally, the data page sectors can be subdivided into sector groups. In process block 530, a part of the page of data is stored in a first sector group with the determined page size and the serial number. For example, in FIG. 1, the controller 120 can store a first portion of the received page of data in a sector group 150, with the page size 164 and serial number 166. The metadata can be appended to the data (pre- or post-pended) or stored in a separate, dedicated space that is not adjacent to the data. In either case the metadata can be stored in association with the data so that the metadata is linked to the data. In process block 540, the serial number can be updated. For example, in FIG. 1, the controller 120 can update the last serial number 172 using the pattern 174 applied to the serial number. In one example, the serial number can be incremented by 1. In decision block 550, a check is made whether the received page of data is completely written. In an IO that requires multiple sector groups of storage, the data would not yet be fully written. Accordingly, decision block 550 is answered in the negative and in process block 560, a next part of the data is stored in a next sector group with the updated serial number. As shown by arrow 562, the process continues by storing portions of the data in each sector group with an updated serial number (but with the same page size which will be 000 if this is not data page write due to wrong alignment or size) until the data is completely written. When the data is completely written, decision block 550 is answered in the affirmative and the write is complete as shown at 570.

Figure 6:
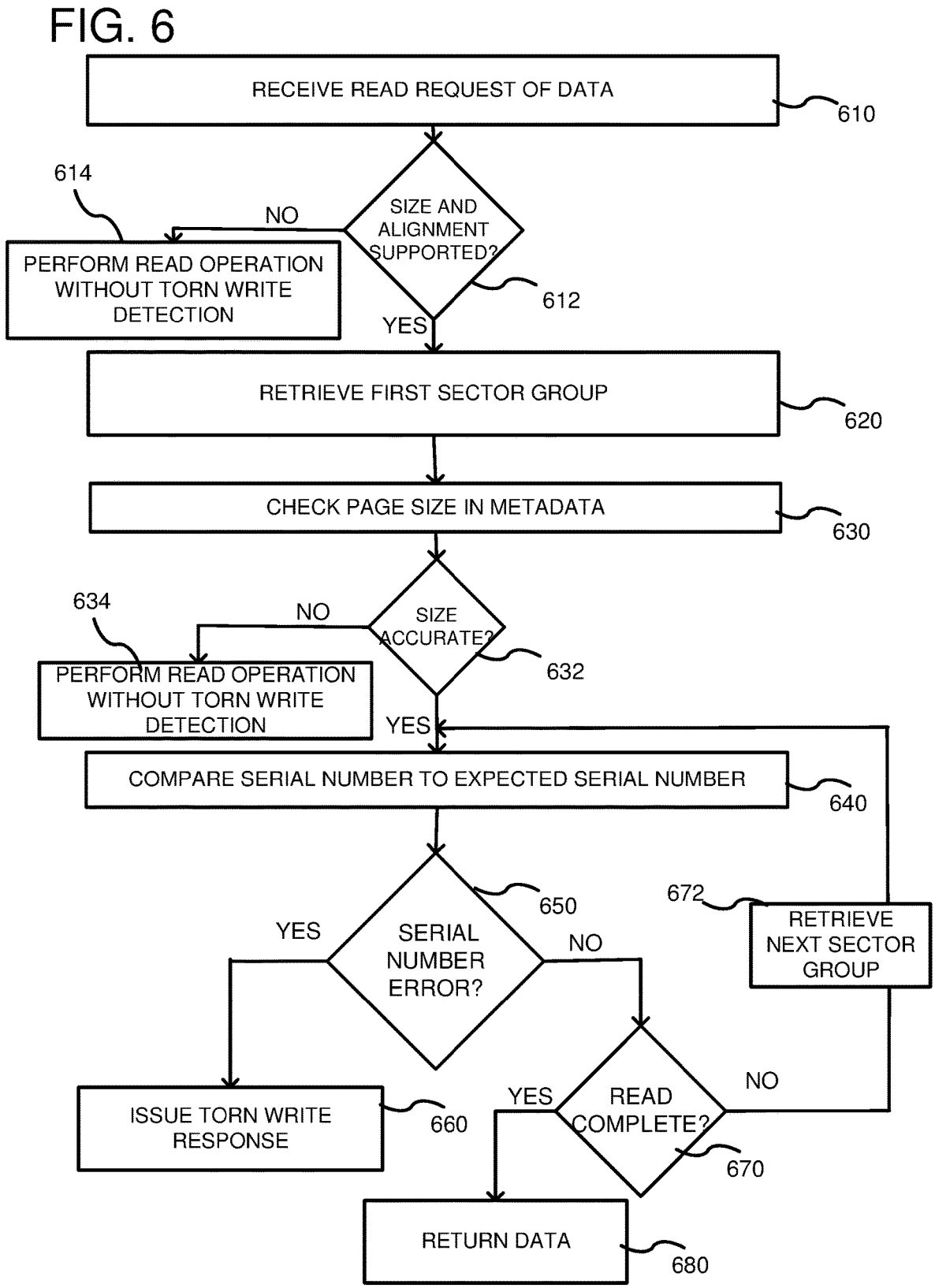
FIG. 6 is a flowchart according to another embodiment wherein metadata is read and checked to detect a torn write.

FIG. 6 is a flowchart according to an embodiment for reading a page of data. In process block 610, a read request for a page of data is received. For example, in FIG. 1, the application 182 can request a page of data. As a result, the read request is received in the controller 120 from the host computer 180. In decision block 612, a read request's size and alignment are checked in the read request to determine if the size and alignment are supported under the torn write detection analysis. For example, a write with the size that is an integer multiple of a sector size and on the boundary which is aligned on that same size is supported. If decision block 612 is answered in the negative, then at 614, the read operation is performed using a traditional read operation without torn write detection. If decision block 612 is answered in the affirmative, then in process block 620, a first sector group of data is retrieved. For example, the page can be stored across multiple sector groups and a first of the sector groups is retrieved by the controller 120 (FIG. 1). In process block 630, a check is made for the data received from the retrieved sector group. More particularly, the metadata from the sector group is examined to determine that the page size (e.g., 8 KiB, 16 KiB, etc.) for the page of data is conformant and is consistent with the read request received. In decision block 632, a check is made to determine if the page size, retrieved from the first sector group metadata, is equal to read this IO size. If not, then at 634, the read operation is performed without torn write detection. Alternatively, in process block 640, a serial number is compared to an expected serial number except in the case of a first sector group read, when no comparison is performed. An example of an expected serial number is one that follows the pattern being used for serial numbers. In decision block 650, a check is made if there is a serial number error. For example, if the comparison shows that a serial number does not follow the pattern expected, then a torn write response is issued (process block 660). Otherwise, at decision block 670, a check is made whether the read is complete. If not, a next sector group is retrieved at 672 and process block 640 is repeated. For each subsequent sector group, the serial number is compared to the one calculated for this sector group according to the pattern being used. For example, in FIG. 3, serial number 332 can be compared to the serial number of the first sector group 330 plus one, 332 being the serial number of the second sector group. Otherwise, if at decision block 670, the read is complete and the read data is sent back to the requestor (process block 680). Thus, the storage volume can perform a self-detection of a torn write using the unique serial numbers. The metadata may be stored along with the data in a sector. Alternatively, the metadata may be stored in a separate location by the storage device, not adjacent to the data. In such a case, the metadata could be retrieved along with the data. In one example, a metadata fetch operation can be available internally, inside of the storage device, and not accessible to the application. In implementations where the application may need access to the metadata, a metadata retrieval could require a special read command, which would return either only metadata for a sector group or return data and metadata into different memory locations on the requesting host. In such cases, the application needs to provide this special read request with an address for pre-allocated RAM for the data and an address for pre-allocated RAM for the metadata.

Figure 7:
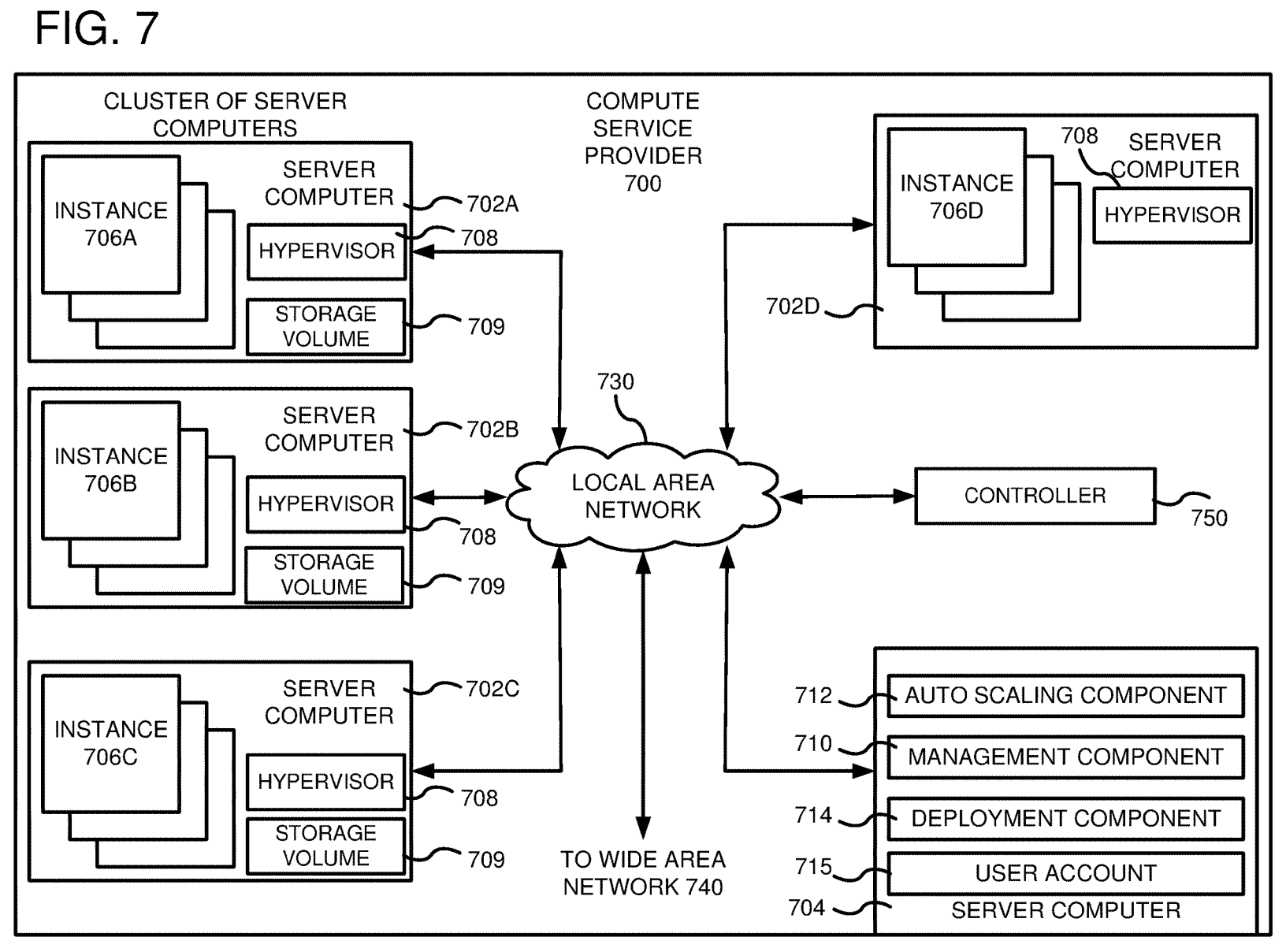

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications. In some cases, the servers 702A-702C can be configured with storage volumes 709, which can be one or more hard drives or SSDs, as described above. Alternatively, in the case of server computer 702D, the server does not need to operate as a storage volume but can be offered for running the instances 706D.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end customers can access the compute service provider 700. It should be appreciated that the network topology illustrated in FIG. 7 has been simplified and that many more networks and networking devices can be utilized to interconnect the various computing systems disclosed herein.

A controller 750 can be used to remotely read and write the storage volume 709, similar to controller 216 (FIG. 2). A single volume can span multiple of the server computers 702A-702C and the controller 750 can be used to read and write the volume, as described above, using metadata to detect torn writes. By using the network 730, the controller 750 can communicate remotely with the storage volume to store a page of data across one or more server computers.

FIG. 8 is a flowchart according to one embodiment for storing a page of data using metadata for detecting a torn write. In process block 810, a page of data is received to be written to a storage volume. For example, in FIG. 1, the controller 120 can receive a page of data to be stored from the application 182 and the host computer 180. In process block 820, a page size is determined for the page of data. In process block 830, a last serial number can be retrieved. For example, in FIG. 1, a last serial number 172 can be stored in the memory 170 of the storage device 110. In process block 840, for a first sector group, a first portion of the page of data is stored together with the page size and the serial number. For example, in FIG. 1, the data 162 can have the page size 164 and serial number 166 appended to it. In process block 850, a pattern is applied to the last serial number to obtain an updated serial number. For example, in FIG. 1, the pattern 174 can be applied to the last serial number. Alternatively, the pattern can be hardcoded. In one example, the last serial number is incremented by 1 for each sector group written. In process block 860, for a second sector group, a second portion of the page of data is stored with the page size and updated serial number. Thus, for the second sector group, the page size is the same, but the serial number is a unique number that is the same as the first sector group, but with the pattern applied to it. Additional sector groups can be stored using a similar technique as needed.

Figure 9:
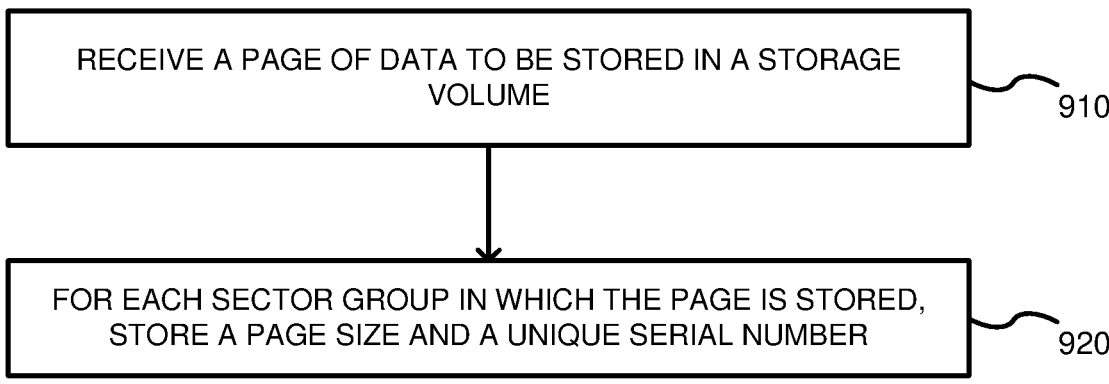
FIG. 9 is a flowchart according to another embodiment for writing data to a storage volume for torn write detection.

FIG. 9 is a flowchart according to another embodiment for storing a page of data for torn write detection. In process block 910, a page of data is received to be stored in a storage volume. For example, in FIG. 2, a page of data can be received by the controller 216 for storage in the storage volume 206, which can include multiple storage devices 210 through 212. In process block 920, for each sector group in which the page is stored, a page size and unique serial number are stored (e.g., appended to the data or stored in association with the data). For example, in FIG. 2, the page size 242, 247 (which can be the same for the same page of data) and unique serial numbers 244 through 248 can be appended to each page of data 240 through 246 stored in the storage volume 206. Using the stored volume 206 with the page size and unique serial numbers, torn writes can be detected.

Figure 10:
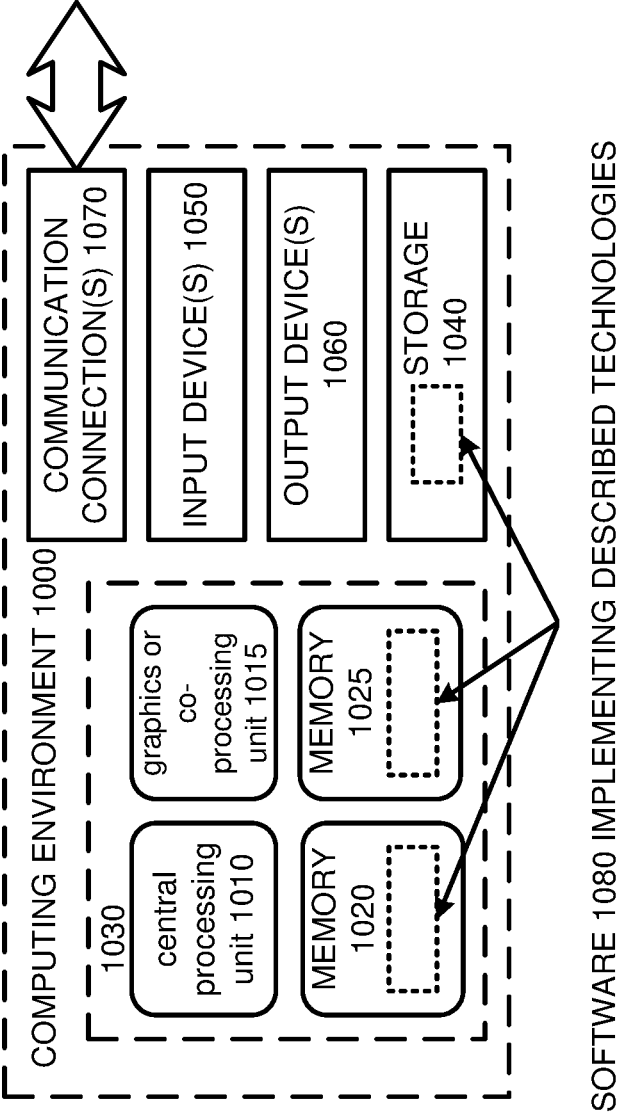
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). In one example, the computing environment 1000 can be used as the host computer 250 (FIG. 2) or the controller 750 (FIG. 7).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting a data corruption in a storage device, the method comprising:

receiving, in the storage device, a page of data to be written to the storage device, wherein the page extends across multiple sectors of the storage device and wherein the page includes multiple sector groups;

determining a page size for the page, wherein the page size is associated with a number of the sectors needed to store the page of data and wherein the page size is used to determine which sector group is a first sector group in the multiple sector groups;

retrieving a last serial number associated with storing the data in the storage device;

for the first sector group, storing a first portion of the page of data with metadata appended including, the page size, and the last serial number to the first portion of the page, wherein the appending of the metadata to the page of data is performed by a controller within the storage device;

applying a pattern to the last serial number to obtain an updated last serial number; and for at least a second sector group, storing a second portion of the page of data, the page size, and the updated last serial number so that a same page size is stored in the first sector group and at least the second sector group and the page size being the same page size is used in detecting torn writes of the page of data.

2. The method of claim 1, further comprising, for each additional sector group needed to store the page of data, storing another portion of the page of data with the page size and a further updated last serial number where the pattern is applied to obtain the further updated last serial number, which differs for each sector.

3. The method of claim 1, wherein the updated last serial number is stored for use with future requests to store a page of data and saved persistently in a case of power loss to be retrieved upon system boot.

4. The method of claim 1, wherein upon a read of the page of data, the page size of each sector group is checked for accuracy and the serial number is checked in each sector group to ensure the pattern is followed.

5. The method of claim 1, wherein the pattern is to increment the serial number by 1 for each sector group of the page of data written.

6. A method, comprising:

receiving data to be stored in a storage device, wherein the data is of a size to be stored in two or more sector groups of the storage device;

for each of the two or more sectors, storing with the data, a page size of the data determined by the number of sectors needed to store the data and wherein the page size is used to determine which sector group is a first sector group and a unique serial number, wherein the unique serial number changes for each sector group, wherein the page size is appended to the data as metadata and wherein the storage device determines the page size after the receiving of the data and the storage device appends the page size to the data; and checking, during a read of the data, whether the page size and the unique serial number are expected values and, if not, reporting a torn write error.

7. The method of claim 6, wherein the changing of the unique serial number includes incrementing or decrementing the unique serial number with respect to a previously stored sector group of the data.

8. The method of claim 6, wherein the storage device comprises a persistent, modifiable data storage mechanism.

9. The method of claim 8, wherein the persistent modifiable data storage mechanism includes one or more hard drives or solid-state drives.

10. The method of claim 6, wherein the expected value of the unique serial number includes comparing the unique serial number in each sector group, starting from the second sector group, to a previous sector group's unique serial number to ensure that the unique serial number is a greater value than the previous sector group's unique serial number.

11. The method of claim 6, wherein the expected value of the page size in each sector group is a same value.

12. The method of claim 6, wherein the receiving of the data is within a storage controller of the storage device and the method further includes computing the page size based on a size of the data and first Logical Block Address (LBA) alignment.

13. The method of claim 6, wherein the storing with the data includes appending the page size and the unique serial number to the data or storing the page size and the unique serial number separate from the data but associated with the data.

14. A storage device, comprising:

multiple storage sectors for storing data of the storage device; and a controller within the storage device for writing and reading the data to and from the multiple storage sectors;

wherein the controller is configured to store the data in the multiple storage sectors by appending metadata to the data for detecting a torn write, wherein the metadata includes a page size, calculated by the storage device, for the data and wherein the page size is used to determine which sector group is a first sector group and a unique serial number for each of the multiple storage sector groups and wherein the page size is stored in each of the multiple storage sector groups.

15. The storage device of claim 14, wherein the storage device includes hard drives or solid-state drives.

16. The storage device of claim 14, wherein the storage device is within a database of a file system.

17. The storage device of claim 14, wherein the controller is configured to read the multiple storage sectors and compare a first of the unique serial numbers of one storage sector group against a unique serial number of another storage sector group and determine whether the difference between that serial number and the first unique serial number is less than N−1, N being sector group position in the page, and, if so, report a torn write error to a host server computer.

18. The storage device of claim 14, wherein the page size is dependent upon a number of the multiple storage sectors needed to store the data and first Logical Block Address (LBA) alignment.

* * * * *